US012470802B2

United States Patent
Takahashi

(10) Patent No.: US 12,470,802 B2
(45) Date of Patent: Nov. 11, 2025

(54) IMAGE PROCESSING METHOD

(71) Applicant: NEC Corporation, Tokyo (JP)

(72) Inventor: Yusuke Takahashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 18/749,847

(22) Filed: Jun. 21, 2024

(65) Prior Publication Data
US 2024/0340522 A1 Oct. 10, 2024

Related U.S. Application Data

(63) Continuation of application No. 17/781,465, filed as application No. PCT/JP2019/049335 on Dec. 17, 2019, now Pat. No. 12,058,433.

(51) Int. Cl.
H04N 23/611 (2023.01)
G06T 7/70 (2017.01)

(52) U.S. Cl.
CPC ............. H04N 23/611 (2023.01); G06T 7/70 (2017.01); G06T 2207/20021 (2013.01); G06T 2207/30201 (2013.01)

(58) Field of Classification Search
CPC . G06T 2207/20021; G06T 2207/30201; G06T 7/70; G06V 20/53; G06V 40/161; G06V 40/168; H04N 23/611; H04N 23/69; H04N 23/695
See application file for complete search history.

(56) References Cited

U.S. PATENT DOCUMENTS

| | | | | |
|---|---|---|---|---|
| 10,659,679 | B1* | 5/2020 | Beeler | H04N 23/69 |
| 11,659,268 | B2* | 5/2023 | Mizobuchi | G06V 40/172 |
| | | | | 348/207.99 |
| 2008/0292145 | A1 | 11/2008 | Kuniba | H04N 1/6027 |
| | | | | 382/118 |
| 2013/0070116 | A1 | 3/2013 | Suzuki | H04N 23/611 |
| | | | | 348/222.1 |
| 2016/0277724 | A1 | 9/2016 | Linåker | H04N 13/271 |
| 2018/0197018 | A1* | 7/2018 | Nakasu | G06V 40/16 |
| 2019/0102609 | A1 | 4/2019 | Zhao | G06V 40/10 |
| 2022/0132023 | A1* | 4/2022 | Kagaya | G06V 10/25 |

(Continued)

FOREIGN PATENT DOCUMENTS

| | | |
|---|---|---|
| JP | H07-222137 A | 8/1995 |
| JP | 2005-312018 A | 11/2005 |
| JP | 2007-209008 A | 8/2007 |

(Continued)

OTHER PUBLICATIONS

International Search Report for PCT Application No. PCT/JP2019/049335, mailed on Feb. 10, 2020.

(Continued)

Primary Examiner — Amy R Hsu
(74) Attorney, Agent, or Firm — Sughrue Mion, PLLC

(57) ABSTRACT

An image processing apparatus according to the present invention includes: a position detecting unit configured to detect the position of a specific object in an image; a distribution generating unit configured to generate the distribution in the image of the specific object; and an imaging information generating unit configured to generate information used at the time capturing a new image based on the distribution.

17 Claims, 15 Drawing Sheets

(56) References Cited

U.S. PATENT DOCUMENTS

2024/0029453 A1* 1/2024 Sano .................... G06V 20/597

FOREIGN PATENT DOCUMENTS

| | | |
|---|---|---|
| JP | 2009-171428 A | 7/2009 |
| JP | 2011-008704 A | 1/2011 |
| JP | 2011-130382 A | 6/2011 |
| JP | 2011-244454 A | 12/2011 |
| JP | 2012-029338 A | 2/2012 |
| JP | 2018-050146 A | 3/2018 |
| JP | 2019-029886 A | 2/2019 |
| WO | 2014/174737 A1 | 10/2014 |

OTHER PUBLICATIONS

Communication dated Jun. 20, 2023 issued by the Japanese Intellectual Property Office in counterpart Japanese Application No. 2021-565195.
JP Office Action for JP Application No. 2021-565195, mailed on Oct. 17, 2023 with English Translation.

* cited by examiner

Fig.9
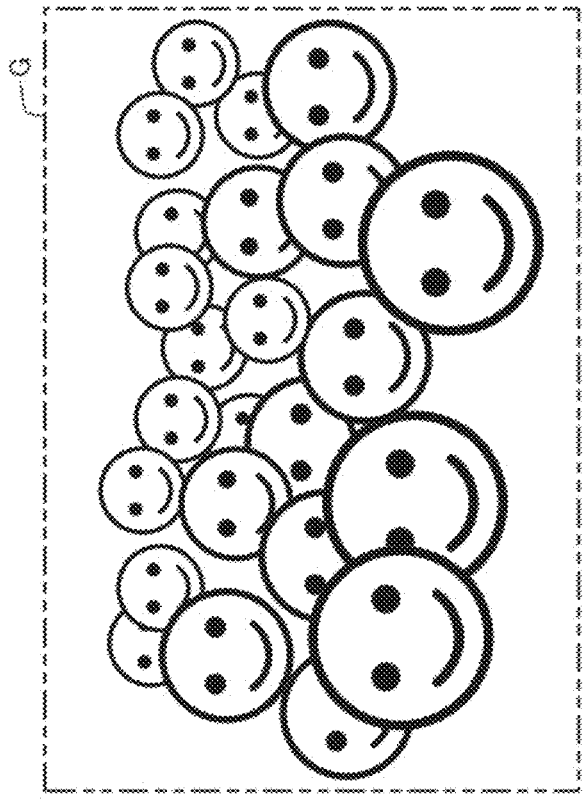
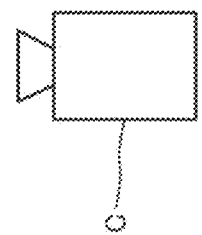
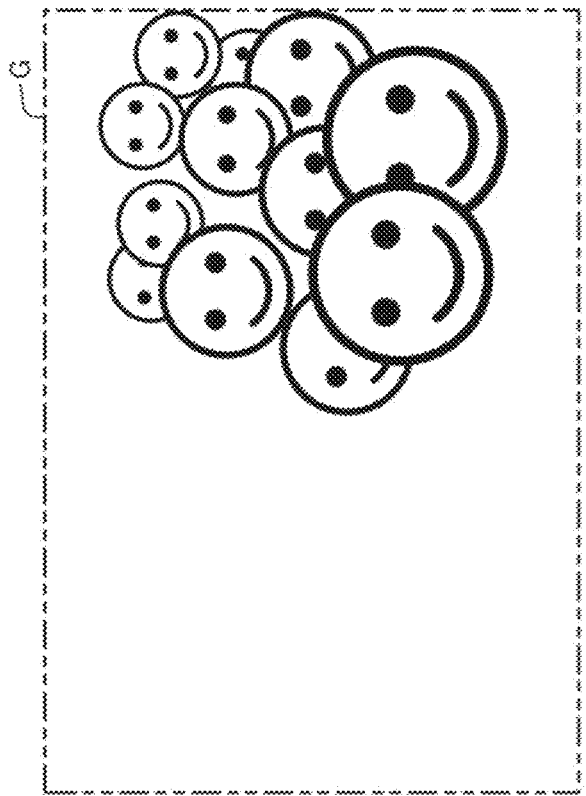
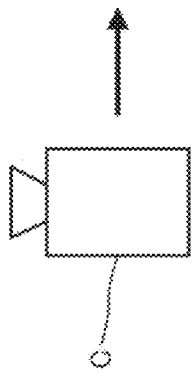

Fig.10
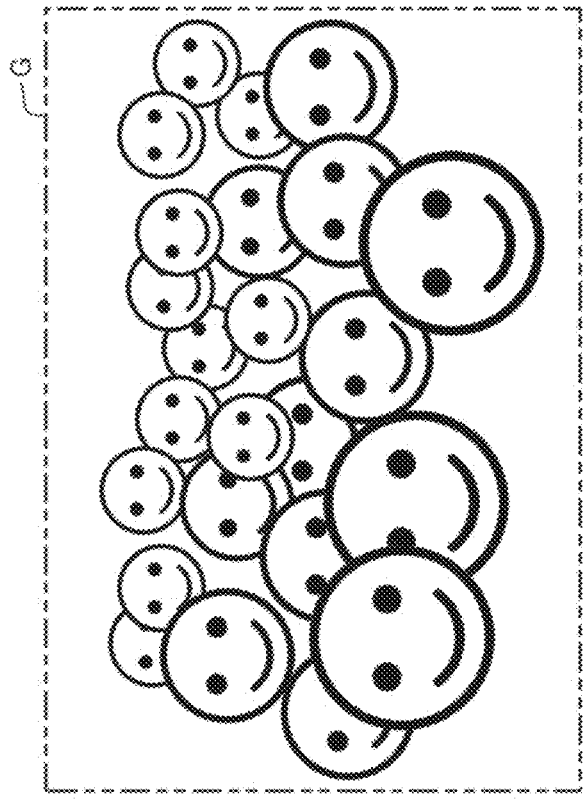
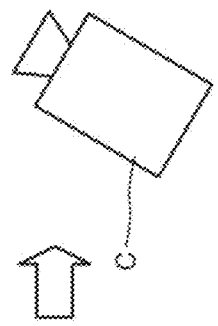
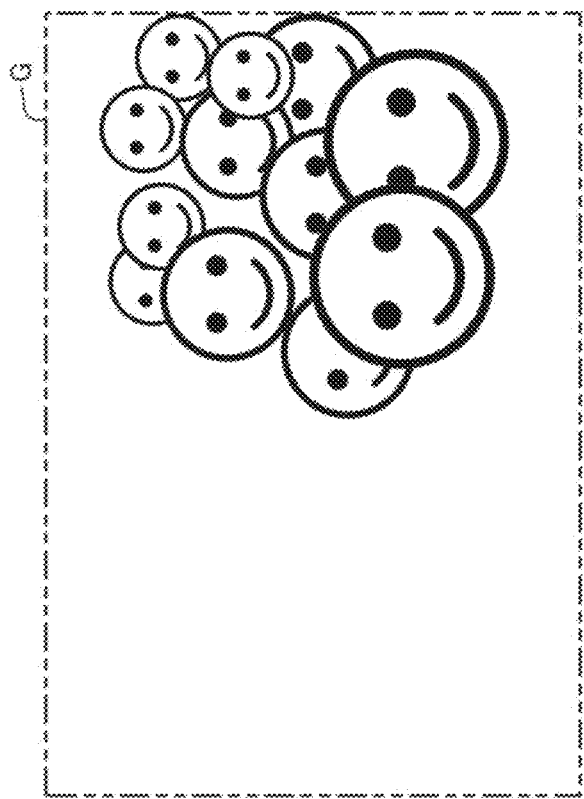
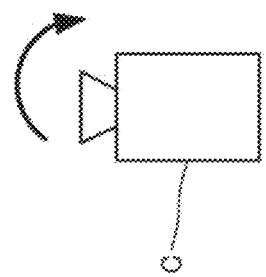

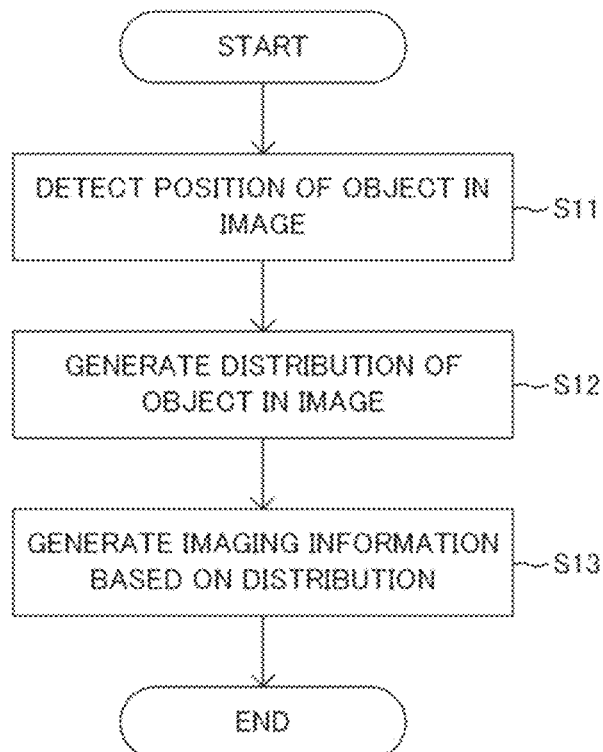

IMAGE PROCESSING METHOD

This application is a Continuation of U.S. application Ser. No. 17/781,465 filed on Jun. 1, 2022, which is a National Stage Entry of PCT/JP2019/049335 filed on Dec. 17, 2019, the contents of all of which are incorporated herein by reference, in their entirety.

TECHNICAL FIELD

The present invention relates to an image processing method for detecting an object from an image, an image processing apparatus, and a program.

BACKGROUND ART

In recent years, with the progress of image processing technology, security cameras are installed in various places to detect persons from images captured by the security cameras. For example, a security camera is installed in a place where many persons gather such as an airport, a station, a commercial facility and an event venue, and detection of a person is performed for a purpose such as checking the number of persons and the degree of congestion and performing a process of matching with previously registered persons such as criminals.

An example of a process of detecting a person from an image is described in Patent Document 1. In Patent Document 1, the image size of an input image is changed, and a face of preset detection face size is detected.

Patent Document 1: Japanese Unexamined Patent Application Publication No. JP-A 2011-008704

However, the abovementioned technique described in Patent Document 1 needs a face detection process on the entire region of an input image, and has a problem that the image is not always of appropriate quality that allows a desired person detection process. For example, there arises a problem that a captured image does not include an appropriate region for detecting a person or a captured image is not of sufficient image quality for detecting a person. Moreover, not only in the case of detecting a person from an image but also in the case of detecting any object from an image, there arises a problem that a captured image is not always of appropriate quality for performing an object detection process.

SUMMARY

Accordingly, an object of the present invention is to provide an image processing method, an image processing apparatus and a program that can solve the abovementioned problem that an image of appropriate quality for performing an object detection process cannot be obtained.

An image processing method as an aspect of the present invention includes: detecting a position of a specific object in an image; generating a distribution in the image of the specific object; and generating information used at time of capturing a new image based on the distribution.

Further, an image processing apparatus as an aspect of the present invention includes: a position detecting unit configured to detect a position of a specific object in an image; a distribution generating unit configured to generate a distribution in the image of the specific object; and an imaging information generating unit configured to generate information used at time of capturing a new image based on the distribution.

Further, a computer program as an aspect of the present invention includes instructions for causing a processor of an information processing apparatus to execute: detecting a position of a specific object in an image; generating a distribution in the image of the specific object; and generating information used at time of capturing a new image based on the distribution.

With the configurations as described above, the present invention makes it possible to obtain an image of appropriate quality for performing an object detection process.

BRIEF DESCRIPTION OF DRAWINGS

FIG. 9 is a view showing an example of processing by the detection apparatus disclosed in FIG. 1;

FIG. 10 is a view showing an example of processing by the detection apparatus disclosed in FIG. 1;

FIG. 15 is a flowchart showing an operation of the object detection apparatus in the second example embodiment of the present invention.

EXAMPLE EMBODIMENTS

First Example Embodiment

Figure 1:
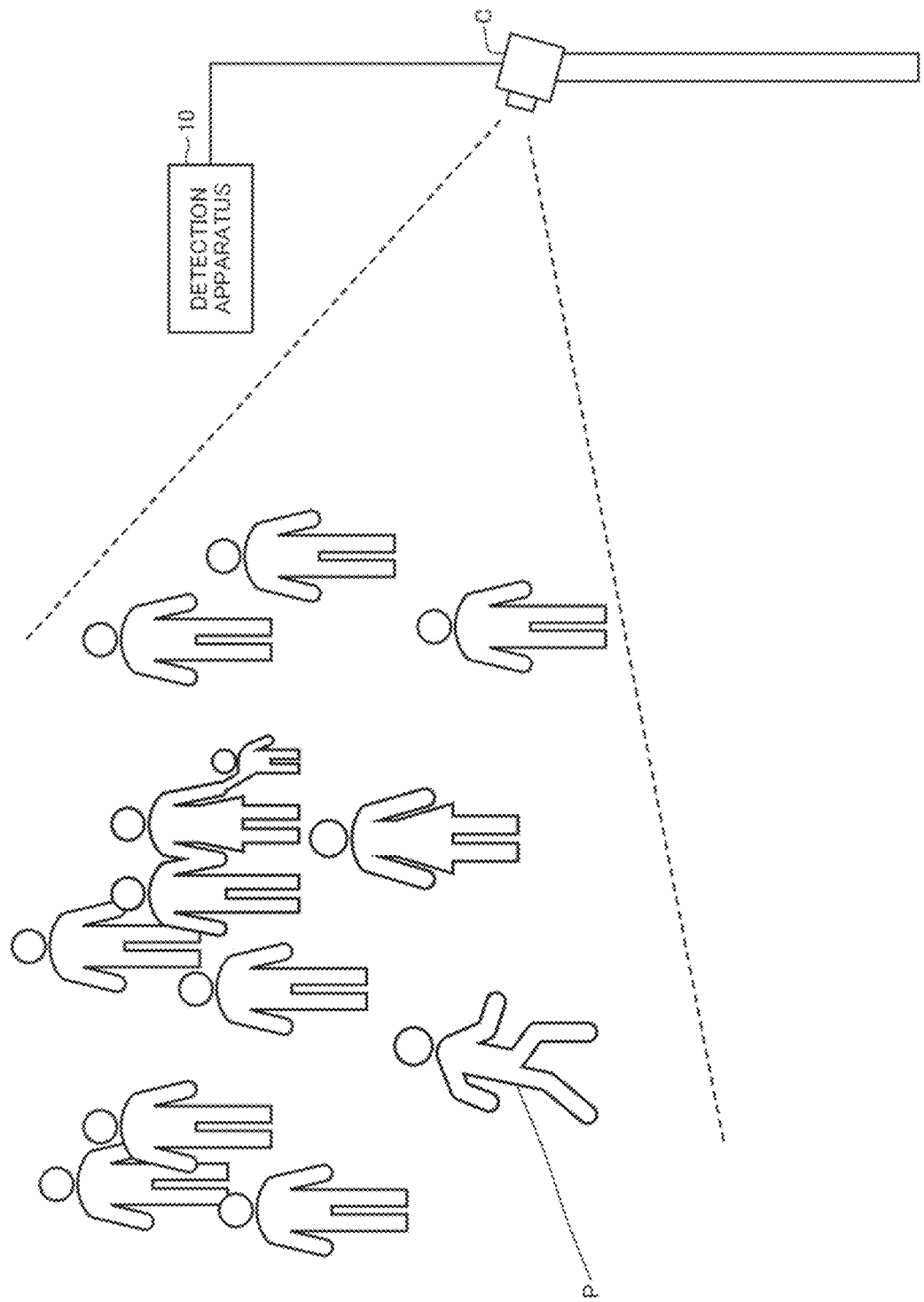
FIG. 1 is a view showing an entire configuration of an information processing system in a first example embodiment of the present invention.
Figure 2:
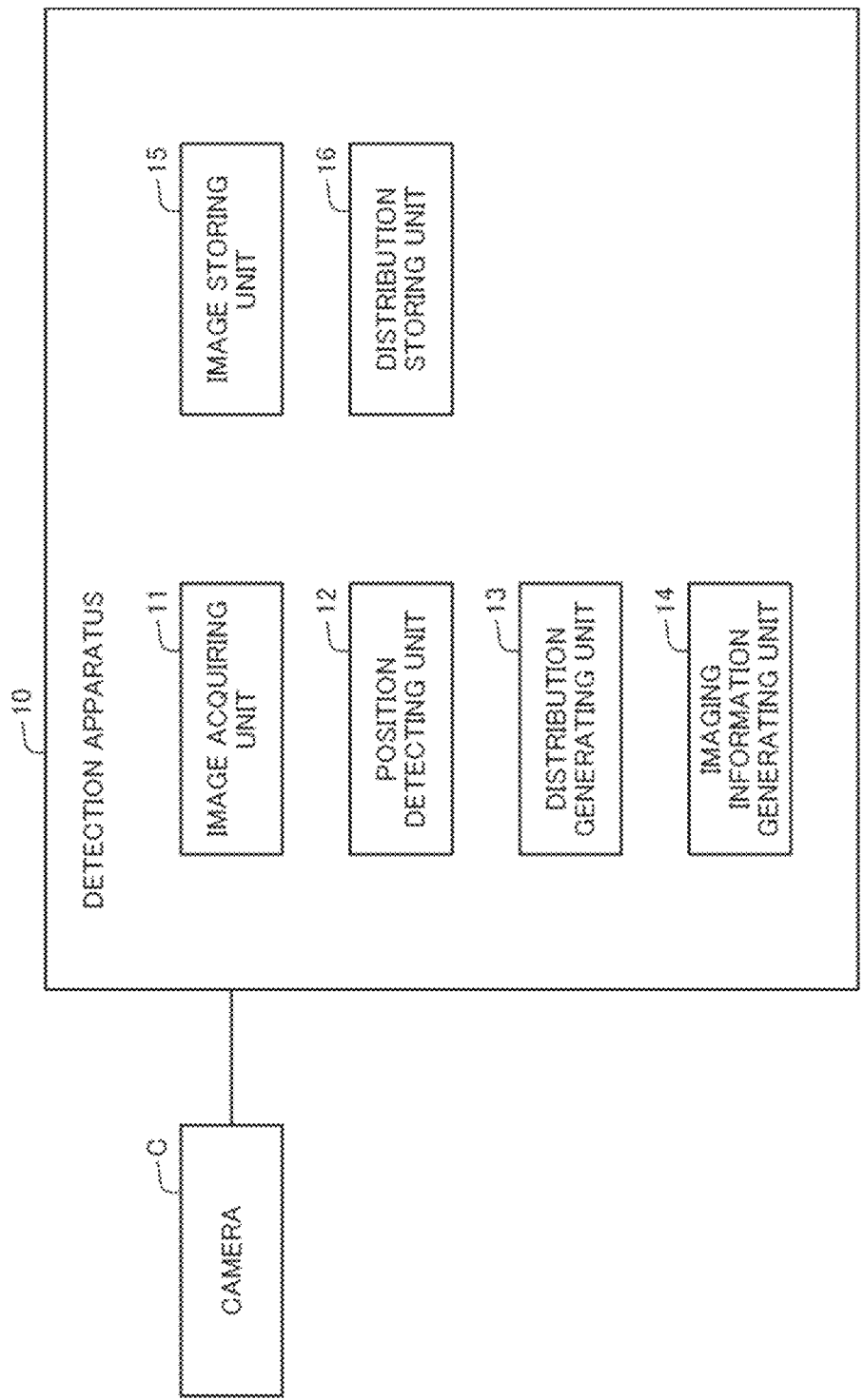
FIG. 2 is a block diagram showing a configuration of a detection apparatus disclosed in FIG. 1.

A first example embodiment of the present invention will be described with reference to FIGS. 1 to 12. FIGS. 1 to 2 are views for describing a configuration of an information processing system, and FIGS. 3 to 12 are views for describing a processing operation of the information processing system.

An information processing system according to the present invention is used for detecting the face of a person P who is in a place where many persons gather such as an airport, a station, a commercial facility and an event venue. For example, the information processing system detects the face of a person P who is in a target place to check the number of persons P and the degree of congestion in the place and to perform a process of matching with previously registered persons such as criminals. However, the information processing system according to the present invention is not limited to detecting the face of a person P for the above-mentioned purpose, and may be used for detecting the face of a person P for any purpose. Moreover, the information processing system according to the present invention is not limited to detecting the face of a person P, and may detect any object.

[Configuration]

As shown in FIG. 1, the information processing system in this example embodiment includes a camera C for capturing an image of a space to be a target place, and a detection apparatus 10 (an image processing apparatus) that performs image processing to detect the face of a person P in the captured image. The detection apparatus 10 is configured by one or a plurality of information processing apparatuses including an arithmetic logic unit (a processor) and a storage unit.

As shown in FIG. 2, the detection apparatus 10 includes an image acquiring unit 11, a position detecting unit 12, a distribution generating unit 13 and an imaging information generating unit 14 that are structured by execution of a program by the arithmetic logic unit. The detection apparatus 10 also includes an image storing unit 15 and a distribution storing unit 16 that are formed in the storage unit. The respective components will be described in detail below.

Figure 3:
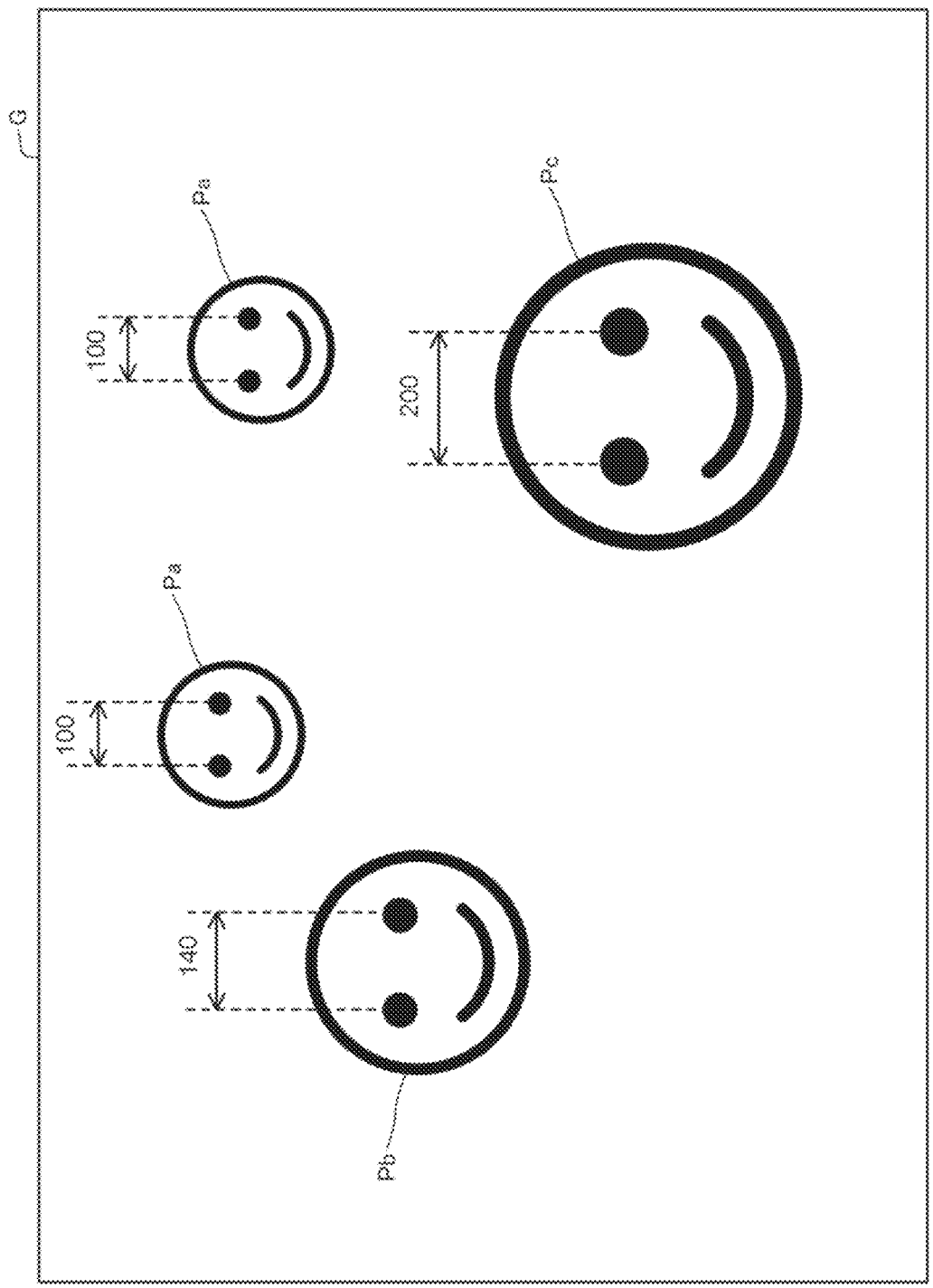
FIG. 3 is a view showing an example of processing by the detection apparatus disclosed in FIG. 1.

The image acquiring unit 11 first accepts a captured image of a target place captured by the camera C at regular time intervals. For example, as shown in FIG. 3, the image acquiring unit 11 accepts a captured image including the faces of a plurality of persons P and temporarily stores into the image storing unit 15. Although only one camera C is connected to the detection apparatus 10 in this example embodiment, a plurality of cameras C may be connected and processing as will be described later may be performed on captured images captured by the respective cameras C.

The position detecting unit 12 (a position detecting unit) extracts a person P in a captured image based on the movement, shape, color and so on of an object shown in the captured image, and also detects the position and size of the face (a specific object) of the extracted person P. Specifically, in this example embodiment, the position detecting unit 12 detects the eye distance of a person P as the face size of the person P. For example, as mentioned above, the position detecting unit 12 detects an eye of a person P based on the movement, shape, color and so on of an object in a captured image, and detects the distance between the two eyes of a single person. As one example, the position detecting unit 12 calculates, for each of persons Pa, Pb and Pc shown in a captured image, an eye distance on captured image of each of the persons as shown in FIG. 3. FIG. 3 shows a case where the eye distances of the two persons Pa located on the upper side in the captured image are 100 pix (pixels), the eye distance of the person Pb located on the left side in the captured image is 140 pix (pixel), and the eye distance of the person Pc located on the right front side in the captured image is 200 pix (pixel).

Then, the position detecting unit 12 stores so as to associate the detected eye distance of the person P and the detected position of the face of the person P on the captured image in the image storing unit 15. At this time, the position detecting unit 12 sets division regions r obtained by dividing an entire captured image G into a plurality of regions as shown by dotted line in FIG. 4, and stores so as to associate the eye distance of the eyes of the person P located in a division region r with the division region r. That is to say, the position of the face of the person P is represented by the position of the division region r in this example embodiment. However, the position detecting unit 12 may represent the position of the face of the person P by another method, for example, represent by the coordinates on the captured image.

The position detecting unit 12 performs detection of the eye distance of a person P in the same manner as described above on a plurality of captured images, and stores so as to associate the eye distance with a division region r. Therefore, for each division region r, the eye distance of a person P located in the division region r is associated and stored in the image storing unit 15. As a result, no eye distance is associated with a division region r where no person P is detected, and a plurality of eye distances are associated with a division region r where a plurality of persons P are detected.

However, the position detecting unit 12 is not limited to detecting the eye distance of a person P, and may detect any information relating to the face of a person P. For example, the position detecting unit 12 may detect the orientation of the face and the image quality of the face region of a person P.

The distribution generating unit 13 (a distribution generating unit) generates the distribution of face positions and eye distances of persons P detected as described above. Specifically, the distribution generating unit 13 sets a detection region R in the following manner. First, the distribution generating unit 13 generates a distribution d of eye distances associated with respective division regions r obtained by dividing a captured image. For example, the distribution generating unit 13 generates a distribution d of eye distances in association with the respective division regions r so as to represent each of the eye distances detected in the division regions r by a bar-shaped body extending from the minimum value to the maximum value on the vertical axis.

However, the distribution generating unit 13 is not limited to generating a distribution d of eye distances of persons P, and may simply generate a distribution of face positions of persons P representing the presence or absence of the face of a person P in each of the division regions r. Moreover, the distribution generating unit 13 may generate any distribution relating to the faces of persons P in the respective division regions r. The distribution generating unit 13 may generate the distribution of the face orientations of persons P, the distribution of the image qualities of the face regions of persons P, and the like, in the respective division regions r. As one example, the distribution generating unit 13 generates the ratio of persons P facing the front as the distribution of the face orientations of persons P, and generates the ratio of satisfactions of a preset definition as the distribution of the image qualities of the face regions of persons P.

Figure 5:
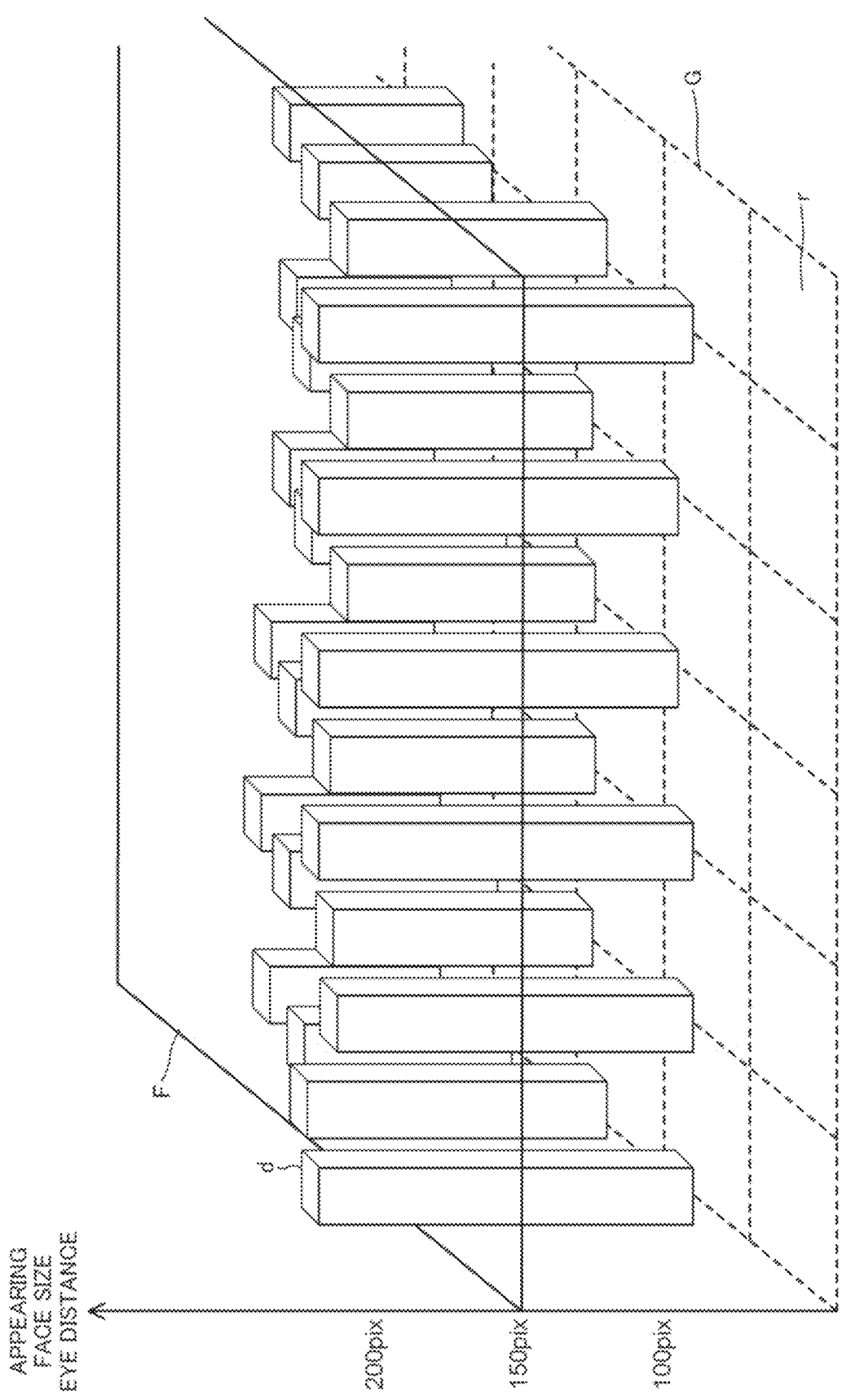
FIG. 5 is a view showing an example of processing by the detection apparatus disclosed in FIG. 1.

The imaging information generating unit 14 (an imaging information generating unit) sets, for a reference eye distance 150 pix, a plane F representing the height position of the eye distance 150 pix as shown in FIG. 5. Then, the imaging information generating unit 14 sets a person region R where the faces of persons P are located in accordance with the positional relation between the plane F and bar-shaped bodies representing a distribution d of eye distances. For example, the distribution generating unit 13 projects the distribution d of eye distances onto the plane F, that is, projects the distribution d in an eye distance direction that is the height direction. Consequently, division regions r where the distribution d represented by bar-shaped bodies are located can be specified in a captured image G that is parallel to the plane F, and a connection region obtained by connecting all the specified division regions r can be generated as the person region R. An example of the person region R generated in the captured image G is shown by a gray region in FIG. 6.

Figure 7:
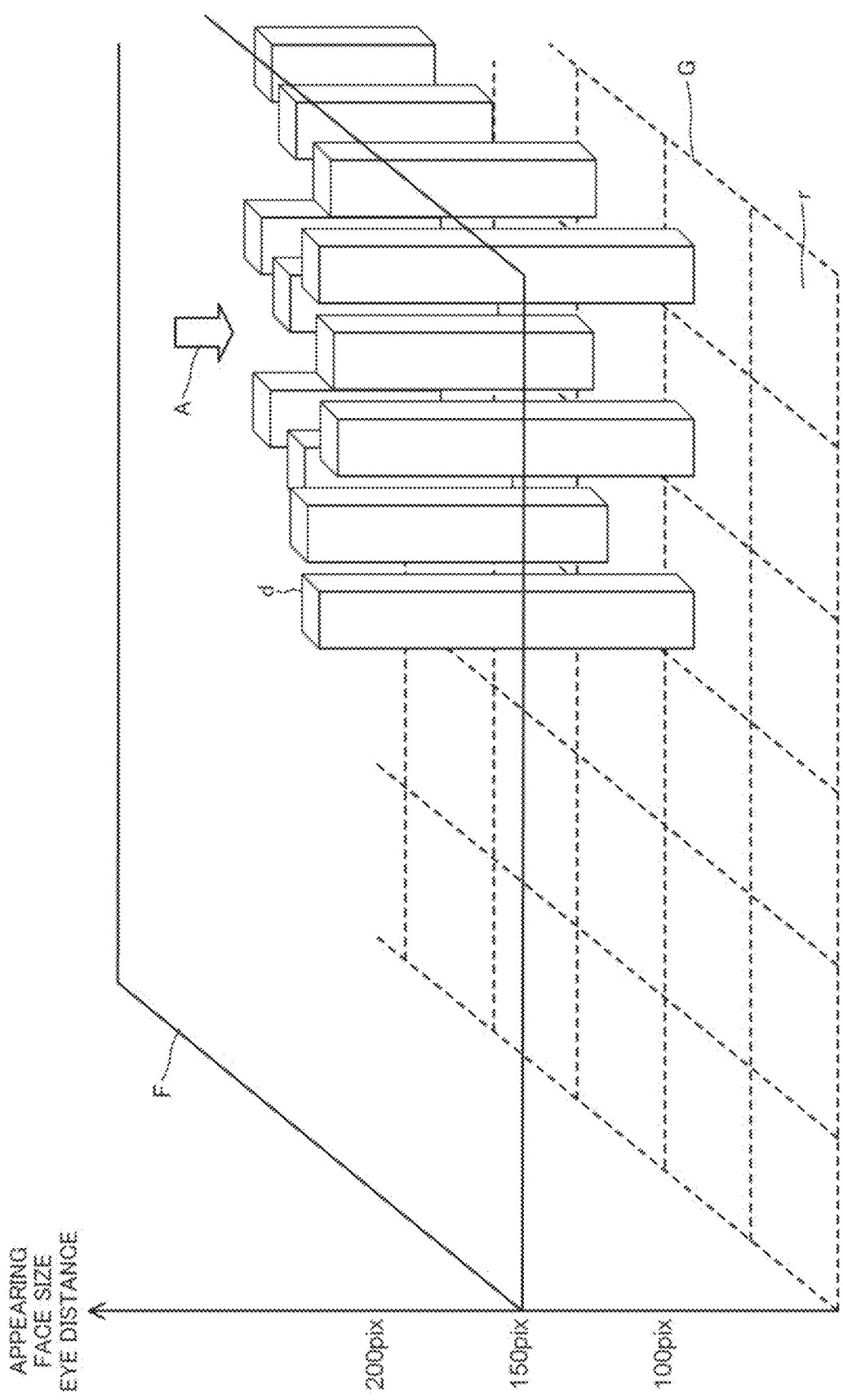
FIG. 7 is a view showing an example of processing by the detection apparatus disclosed in FIG. 1.
Figure 8:
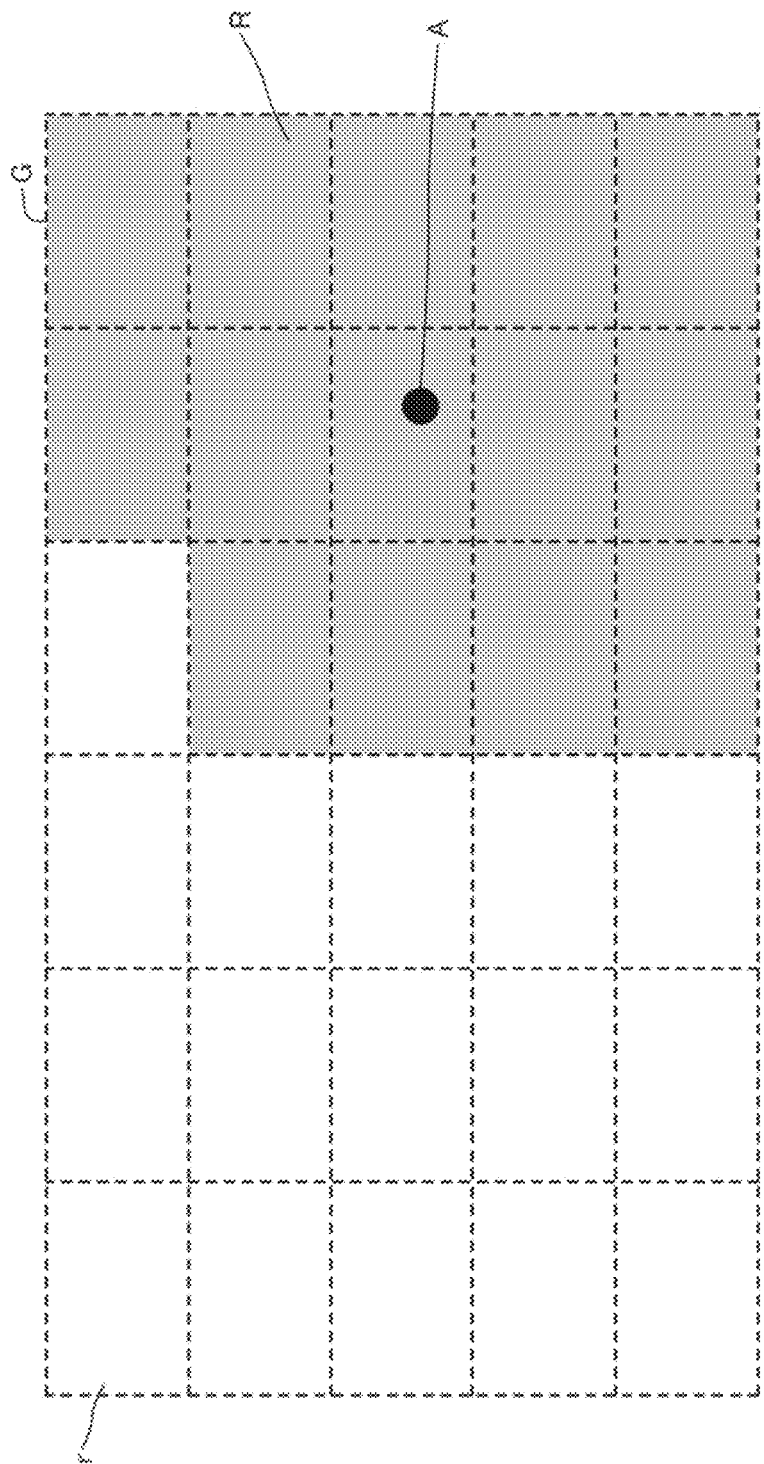
FIG. 8 is a view showing an example of processing by the detection apparatus disclosed in FIG. 1.

Subsequently, the imaging information generating unit 14 calculates the center of gravity of the person region R on the captured image G generated as described above. Here, it is assumed that a distribution d of eye distances of persons as shown in FIG. 7 is generated from the captured image G. This distribution d represents, for example, as shown in the left view of FIG. 9, a case where the faces of persons are located in a cluster in the rightward region of the captured image G. An example of a person region R generated as described above from the distribution d of faces of persons as shown in FIG. 7 is shown by a gray region in FIG. 8. Furthermore, the imaging information generating unit 14 calculates the position of the center of gravity A of the person region R based on information of the person region R. For example, the imaging information generating unit 14 calculates the position of the center of gravity A with respect to the overall shape of the person region R as shown in FIG. 8.

The imaging information generating unit 14 may calculate the position of the center of gravity A in consideration of, in addition to the overall shape of the person region R, the detection status of the face of a person for each position in the captured image. For example, the imaging information generating unit 14 may calculate the center of gravity A by adding a weight corresponding to the number of the detected faces of persons for each division region r or each position in the person region R, and may calculate the center of gravity A by adding a weight corresponding to a detection range from the minimum value to the maximum value of the eye distances of persons.

Furthermore, the imaging information generating unit 14 generates setting information used at the time of capturing a new image with the camera C, based on the calculated position of the center of gravity A of the person region R. For example, in a case where the calculated position of the center of gravity A of the person region R is on the right side in the captured image G as shown in FIGS. 7 and 8, it can be determined that many persons P are located on this side. Therefore, the imaging information generating unit 14 generates information of instructing to change the setting of the position of the camera, "move camera position rightward", as setting information. Alternatively, the imaging information generating unit 14 generates information of instructing to change the setting of the angle of view of the camera, "turn camera rightward", as setting information. Then, the imaging information generating unit 14 outputs so as to notify the setting information generated as described above to the user of the information processing system. Consequently, in a case where the camera C is actually moved rightward by the user, many persons are shown in the captured image G as shown in the right view of FIG. 9. In a case where the camera C is actually turned rightward by the user, many persons are shown in the captured image as shown in the right view of FIG. 10.

Figure 11:
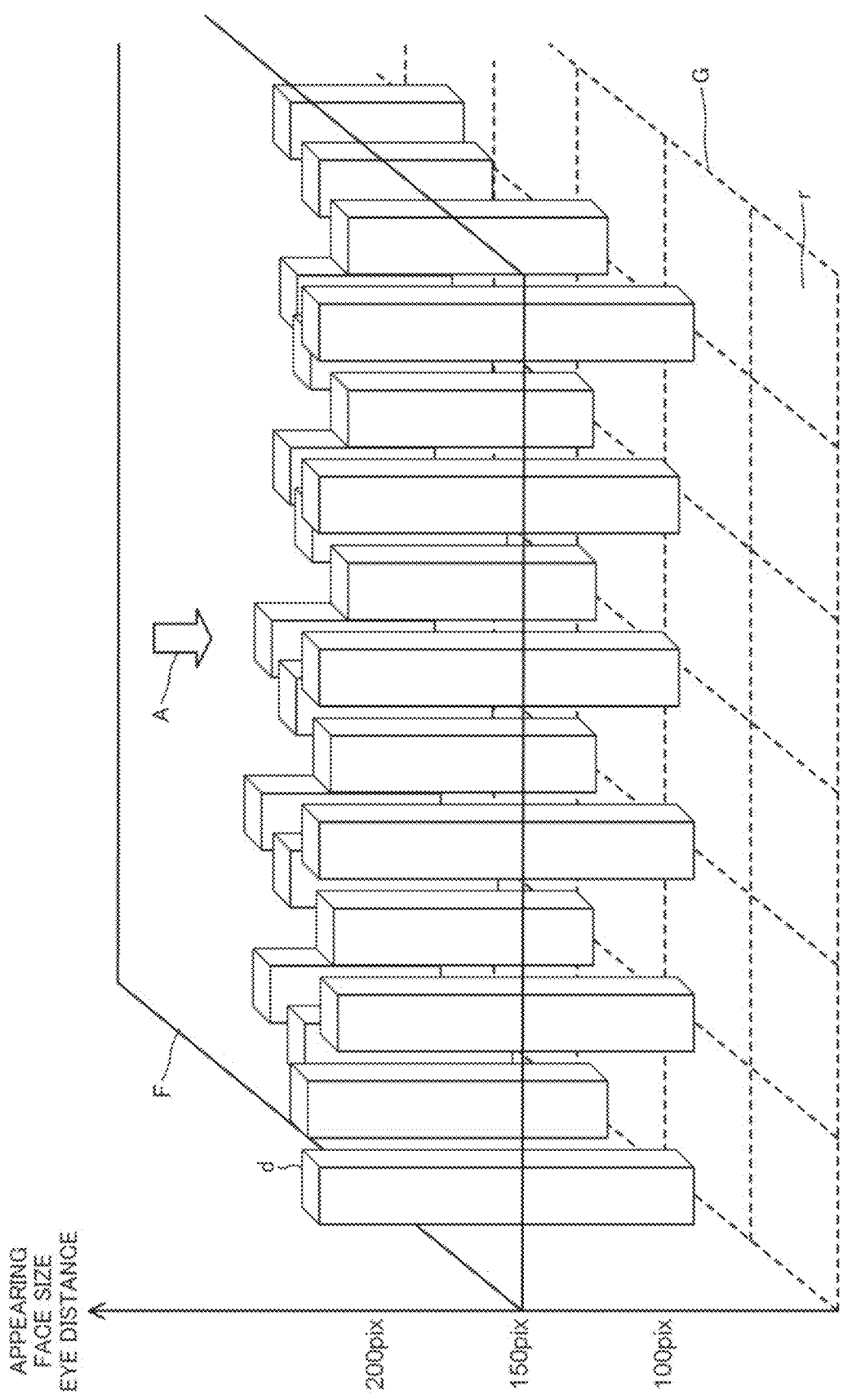
FIG. 11 is a view showing an example of processing by the detection apparatus disclosed in FIG. 1.

On a captured image G newly captured by the camera C, generation of a person region R and calculation of the position of the center of gravity A are performed at all times as described above. In response to this, the imaging information generating unit 14 generates and outputs setting information used at the time of capturing an image with the camera C in the same manner as described above until the position of the center of gravity A of a person region R is located in the center of a captured image as shown in FIG. 11.

Further, the imaging information setting unit 14 is not necessarily limited to generating and outputting setting information as described above, and may generate and output any information as long as it is information necessary for capturing an image. For example, the imaging information generating unit 14 may generate and output information of changing the zoom of the camera C in a case where a person region R is concentrated in the center of a captured image G or in a case where a person region R is spread over the entire captured image G.

Further, the imaging information generating unit 14 is not necessarily limited to generating setting information based on the position of the center of gravity A of a person region R as described above, and may generate and output information necessary for capturing an image based on any distribution of a person P. For example, in a case where the distribution of the face orientations of persons P is generated as mentioned above, the imaging information generating unit 14 may generate and output information of changing the orientation or zoom of the camera C based on the distribution. Moreover, for example, in a case where the distribution of image qualities of the face regions of persons P is generated as mentioned above, the imaging information generating unit 14 may generate and output information of changing the orientation, zoom and focal length (pint) of the camera C based on the distribution. For example, by changing the zoom and focal length of the camera C, it is possible to change the quality of a captured image, such as make a captured image sharp.

Further, the imaging information generating unit 14 may output the distribution of the eye distances of persons P shown in FIG. 7 and information representing a person region R and the position of the center of gravity A thereof shown in FIGS. 7 and 8, as information used at the time of capturing a new image. Consequently, a user who has seen the information can operate so as to be able to obtain an appropriate image, such as move the position of the camera C and change the orientation of the camera C.

[Operation]

Figure 12:
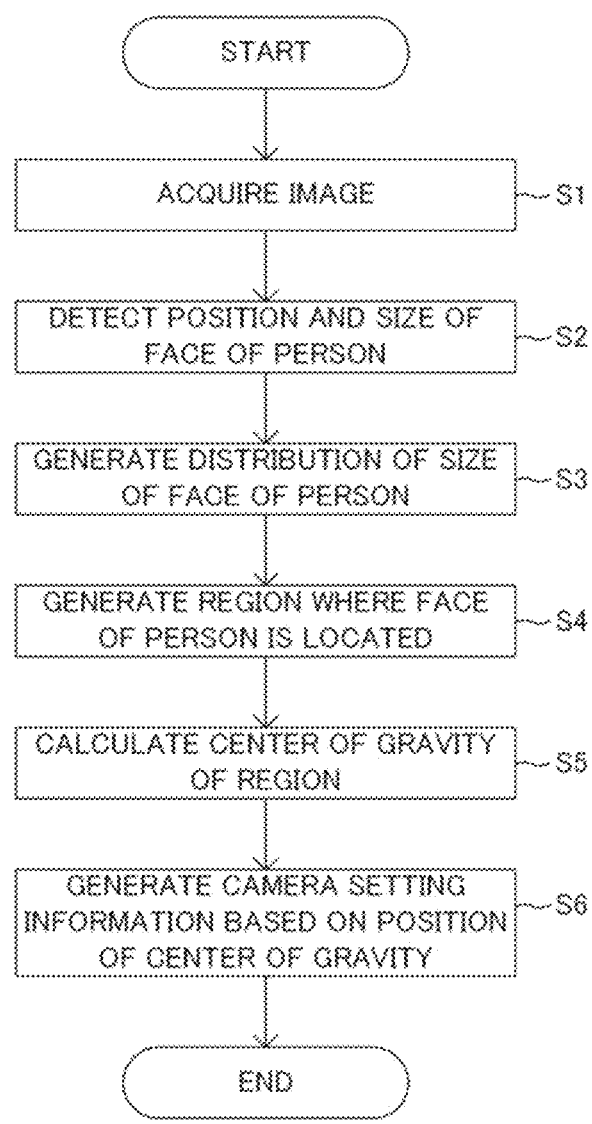
FIG. 12 is a flowchart showing a processing operation by the detection apparatus disclosed in FIG. 1.

Next, an operation of the above information processing system will be described mainly with reference to a flowchart of FIG. 12. First, the information processing system captures an image of a target place with the camera C, and the detection apparatus 10 acquires the captured image (step S1). Then, the detection apparatus 10 detects the position and size of the face of a person P in the captured image (step S2). Here, as shown in FIG. 3, the detection apparatus 10 detects the eye distance of the person P, and stores so as to associate the detected eye distance of the person P with a division region r that is information representing the detected position of the face of the person P on the captured image. The detection apparatus 10 performs detection of the eye distance of a person P on a plurality of captured images, and stores the position.

Figure 4:
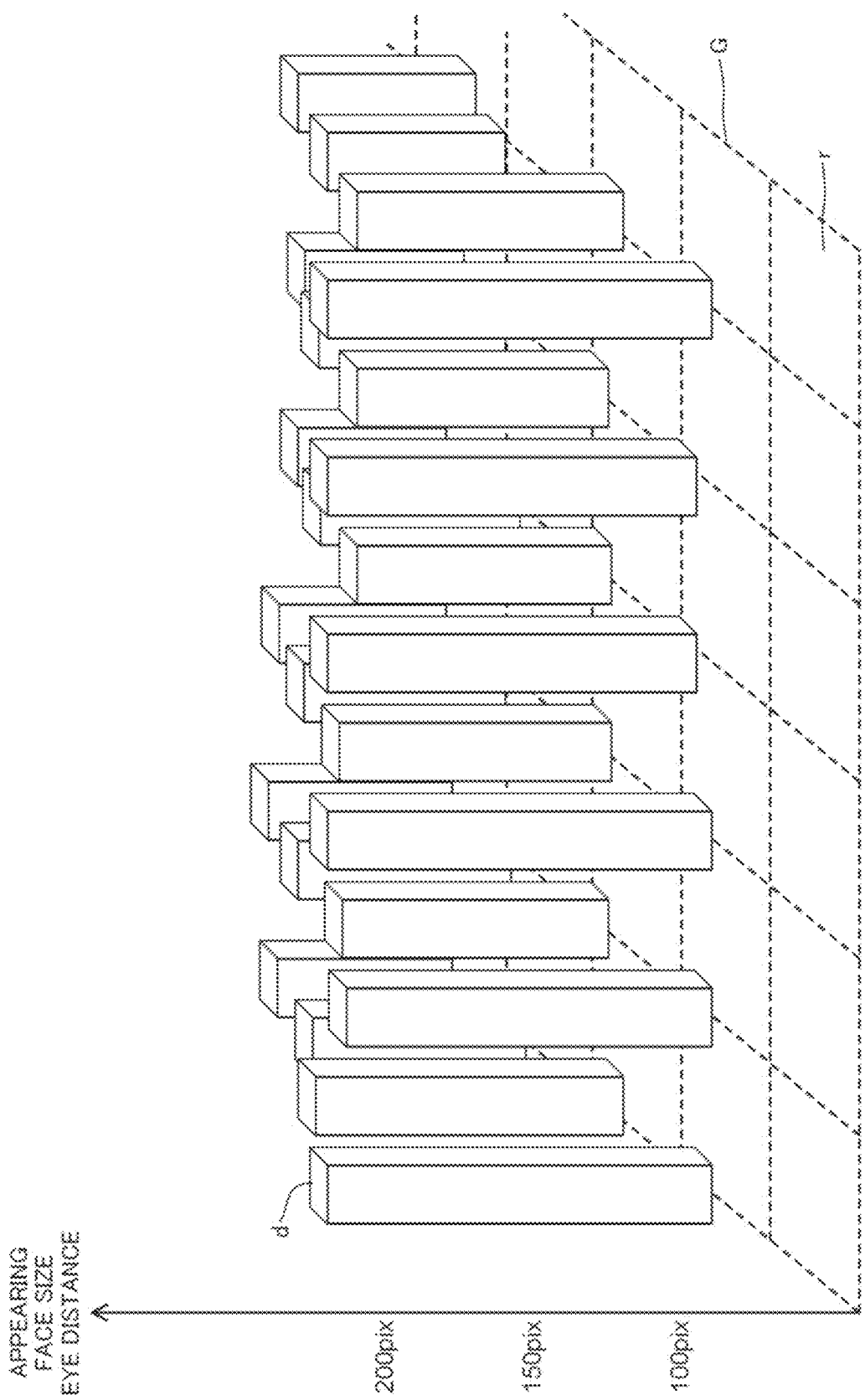
FIG. 4 is a view showing an example of processing by the detection apparatus disclosed in FIG. 1.

Subsequently, the detection apparatus 10 generates the distribution of the face positions and eye distances of the persons P (step S3). For example, as shown in FIG. 4, the detection apparatus 10 generates a distribution d of the eye distances associated with respective division regions r obtained by dividing the captured image G. The detection apparatus 10 is not limited to generating the distribution d of the eye distances of the persons P, and may generate any distribution relating to the persons P.

Figure 6:
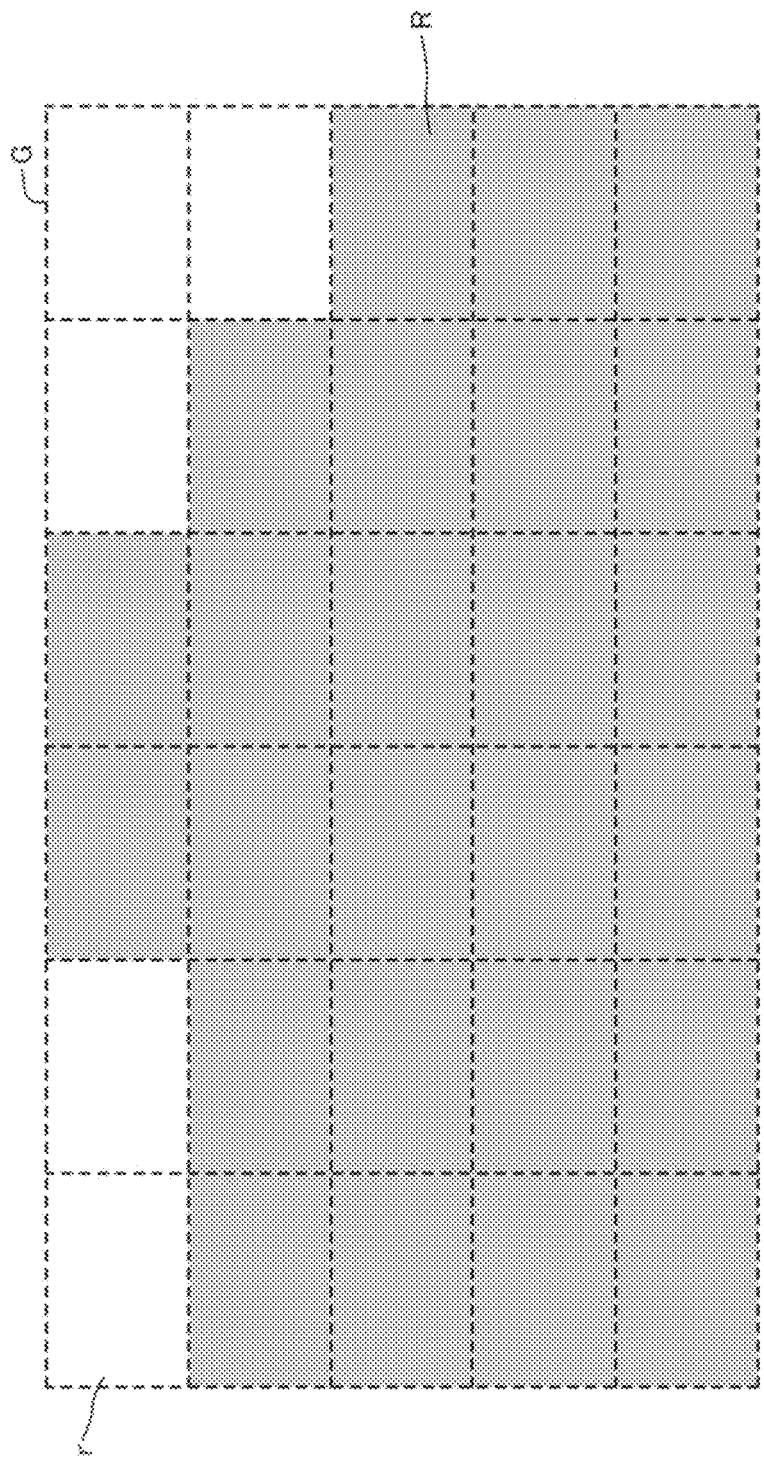
FIG. 6 is a view showing an example of processing by the detection apparatus disclosed in FIG. 1.

Subsequently, as shown in FIGS. 5 and 6, the detection apparatus 10 generates a person region R where the persons P exist in the captured image G based on the distribution d of the eye distances of the persons P (step S4). Then, as shown in FIGS. 7 and 8, the detection apparatus 10 calculates the position of the center of gravity A of the person region R (step S5).

Subsequently, the detection apparatus 10 generates setting information used at the time of capturing a new image with the camera C based on the calculated position of the center of gravity A of the person region R (step S6). For example, in a case where the calculated position of the center of gravity A of the person region R is located rightward in the captured image as shown in FIGS. 7 and 8, the detection apparatus 10 generates and outputs information of changing the setting of the position and angle of view of the camera C. Then, the user changes the setting of the position and angle of view of the camera C in response to the output of the information, and many persons are thereby shown in the captured image G as shown in FIGS. 9 and 10.

After that, every time a new image is captured by the camera C, the detection apparatus 10 may generate a person region R and calculate the position of the center of gravity A, and generate and output setting information used at the time of capturing an image with the camera C in the same manner as described above until the position of the center of gravity A of the person region R is located in the center of the captured image as shown in FIG. 11. Meanwhile, the detection apparatus 10 is not necessarily limited to generating and outputting setting information of the camera C as described above, and may generate and output any information as long as it is information necessary for capturing an image.

As described above, in this example embodiment, first, the position of an appearing person is detected in a captured image, and the distribution of persons in the captured image is generated. Then, information used at the time of capturing a new image is generated based on the distribution. Since information of setting used at the time of capturing a new image is thus generated in accordance with the position of a person appearing in an already captured image, a new image can be captured by using the information. As a result, a new image of appropriate quality for performing a person detection process can be acquired.

Although a case where the detection apparatus 10 detects the face of a person P in a captured image is illustrated above, a target to be detected may be any object. In this case, instead of detecting the abovementioned eye distance of a person P to detect the position of the face of the person P, the detection apparatus 10 may detect the position of an object to be detected, generate a distribution in an image of the object in accordance with the position of the object, and generate information used at the time of capturing a new image based on the distribution.

Second Example Embodiment

Figure 13:
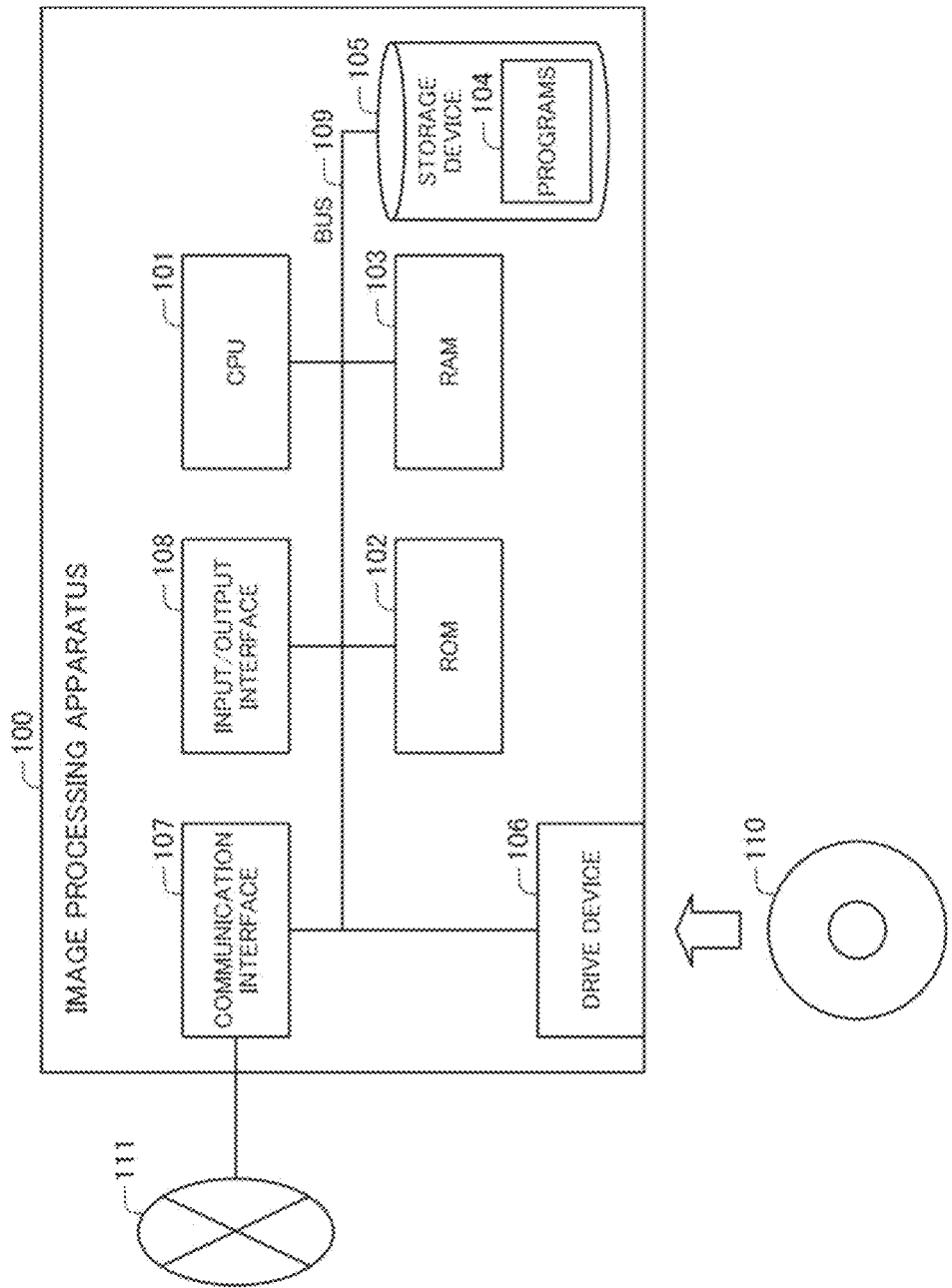
FIG. 13 is a block diagram showing a hardware configuration of an object detection apparatus in a second example embodiment of the present invention.
Figure 14:
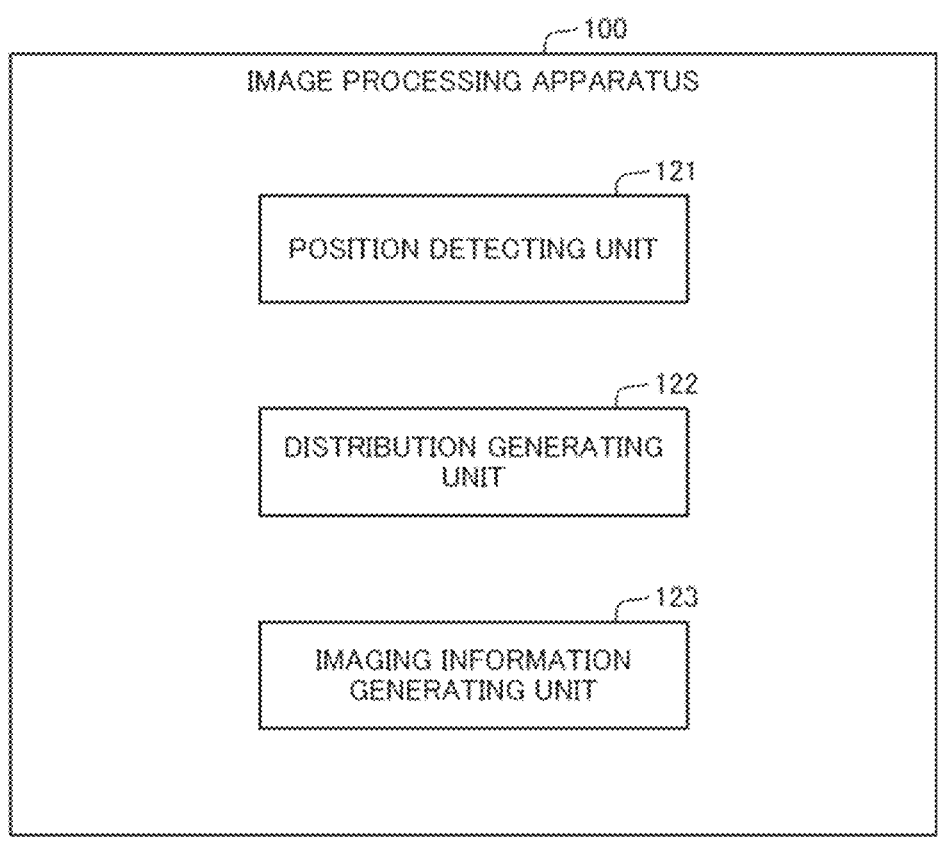
FIG. 14 is a block diagram showing a configuration of the object detection apparatus in the second example embodiment of the present invention.

Next, a second example embodiment of the present invention will be described with reference to FIGS. 13 to 15. FIGS. 13 to 14 are block diagrams showing a configuration of an information processing apparatus in the second example embodiment, and FIG. 15 is a flowchart showing an operation of the information processing apparatus. This example embodiment shows the overview of the configurations of the detection apparatus 10 and the image processing method described in the first example embodiment.

First, a hardware configuration of an image processing apparatus 100 in this example embodiment will be described with reference to FIG. 13. The image processing apparatus 100 is configured by one or a plurality of generally-used information processing apparatuses. As one example, the image processing apparatus 100 includes the following hardware configuration;

a CPU (Central Processing Unit) 101 (arithmetic logic unit),
a ROM (Read Only Memory) 102 (storage unit),
a RAM (Random Access Memory) 103 (storage unit),
programs 104 loaded to the RAM 103,
a storage device 105 for storing the programs 104,
a drive device 106 reading from and writing into a storage medium 110 outside the information processing apparatus,
a communication interface 107 connected to a communication network 111 outside the information processing apparatus,
an input/output interface 108 inputting and outputting data, and
a bus 109 connecting the respective components.

Then, the image processing apparatus 100 can structure and include a position detecting unit 121, a distribution generating unit 122 and an imaging information generating unit 123 shown in FIG. 14 by acquisition and execution of the programs 104 by the CPU 101. The programs 104 are, for example, stored in the storage device 105 and the ROM 102 in advance, and loaded to the RAM 103 and executed by the CPU 101 as necessary. Moreover, the programs 104 may be supplied to the CPU 101 via the communication network 111, or may be stored in the storage medium 110 in advance and retrieved and supplied to the CPU 101 by the drive device 106. The abovementioned position detecting unit 121, distribution generating unit 122 and imaging information generating unit 123 may be structured by an electronic circuit.

FIG. 13 shows an example of the hardware configuration of the image processing apparatus 100, and the hardware configuration of the image processing apparatus 100 is not limited to the above case. For example, the image processing apparatus 100 may be configured by part of the above configuration, such as excluding the drive device 106.

Then, the image processing apparatus 100 executes an image processing method shown in the flowchart of FIG. 15 by the functions of the position detecting unit 121, the distribution generating unit 122 and the imaging information generating unit 123 structured by the program as described above.

As shown in FIG. 15, the image processing apparatus 100:
detects the position of a specific object in an image (step S11);
generates a distribution in the image of the specific object (step S12); and
generates information used at the time of capturing a new image based on the distribution (step S13).

In this example embodiment, with the configuration as described above, information such as setting used at the time of capturing a new image is generated in accordance with a distribution based on the position of a person appearing in an already captured image. Then, by capturing a new image by using the generated information, it is possible to acquire a new image of appropriate quality for performing a person detection process.

<Supplementary Notes>

The whole or part of the example embodiments disclosed above can be described as the following supplementary notes. Below, the overview of the configurations of an image processing apparatus, an image processing method and a program according to the present invention will be described. However, the present invention is not limited to the following configurations.

(Supplementary Note 1)
An image processing method comprising:
detecting a position of a specific object in an image;
generating a distribution in the image of the specific object; and
generating information used at time of capturing a new image based on the distribution.

(Supplementary Note 2)
The image processing method according to Supplementary Note 1, comprising
generating, as the distribution, information representing a division region where the specific object is located in the image among division regions obtained by dividing the image into a plurality of regions.

(Supplementary Note 3)
The image processing method according to Supplementary Note 2, comprising
generating a connection region obtained by connecting all the division regions where the specific object is located based on the distribution, and generating the information used at time of capturing the new image based on the connection region.

(Supplementary Note 4)
The image processing method according to Supplementary Note 3, comprising
calculating a position of a center of gravity of the connection region in the image, and generating the information used at time of capturing the new image based on the position of the center of gravity.

(Supplementary Note 5)
The image processing method according to Supplementary Note 4, comprising
calculating the position of the center of gravity of the connection region in the image in accordance with a detection status of the specific object in each of the division regions.

(Supplementary Note 6)
The image processing method according to any of Supplementary Notes 1 to 5, comprising
generating information of changing setting at time of capturing the new image with an image capture device based on the distribution.

(Supplementary Note 7)
The image processing method according to Supplementary Note 6, comprising
generating information of changing a shooting range at time of capturing the new image with the image capture device based on the distribution.

(Supplementary Note 8)
The image processing method according to Supplementary Note 6 or 7, comprising
generating information of changing a quality at time of capturing the new image with the image captured device based on the distribution.

(Supplementary Note 9)
The image processing method according to any of Supplementary Notes 1 to 8, comprising:
performing detection of the position of the specific object in the image on a plurality of images; and
generating the distribution in the image of the specific object based on the positions of the specific objects detected from the plurality of images.

(Supplementary Note 10)
The image processing method according to any of Supplementary Notes 1 to 9, comprising
detecting a position of a person's face that is the specific object.

(Supplementary Note 11)
An image processing apparatus comprising:
a position detecting unit configured to detect a position of a specific object in an image;
a distribution generating unit configured to generate a distribution in the image of the specific object; and
an imaging information generating unit configured to generate information used at time of capturing a new image based on the distribution.

(Supplementary Note 12)
The image processing apparatus according to Supplementary Note 11, wherein
the distribution generating unit is configured to generate, as the distribution, information representing a division region where the specific object is located in the image among division regions obtained by dividing the image into a plurality of regions.

(Supplementary Note 13)
The image processing apparatus according to Supplementary Note 12, wherein
the imaging information generating unit is configured to generate a connection region obtained by connecting all the division regions where the specific object is located based on the distribution, and generate the information used at time of capturing the new image based on the connection region.

(Supplementary Note 14)
The image processing apparatus according to Supplementary Note 13, wherein
the imaging information generating unit is configured to calculate a position of a center of gravity of the connection region in the image, and generate the information used at time of capturing the new image based on the position of the center of gravity.

(Supplementary Note 15)
The image processing apparatus according to Supplementary Note 14, wherein
the imaging information generating unit is configured to calculate the position of the center of gravity of the connection region in the image in accordance with a detection status of the specific object in each of the division regions.

(Supplementary Note 16)
The image processing apparatus according to any of Supplementary Notes 11 to 15, wherein
the imaging information generating unit is configured to generate information of changing setting at time of capturing the new image with an image capture device based on the distribution.

(Supplementary Note 17)
A computer program comprising instructions for causing a processor of an information processing apparatus to execute:
detecting a position of a specific object in an image;
generating a distribution in the image of the specific object; and
generating information used at time of capturing a new image based on the distribution.

The above program can be stored by using various types of non-transitory computer-readable mediums and supplied to a computer. The non-transitory computer-readable mediums include various types of tangible storage mediums.

Examples of the non-transitory computer-readable mediums include a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, and a semiconductor memory (for example, a mask ROM, a PROM (Programmable ROM), an EPROM (Erasable PROM), a flash ROM, a RAM (Random Access Memory)). Moreover, the programs may be supplied to a computer by various types of transitory computer-readable mediums. Examples of the transitory computer-readable mediums include an electric signal, an optical signal, and an electromagnetic wave. The transitory computer-readable mediums can supply the program to a computer via a wired communication path such as an electric wire and an optical fiber or via a wireless communication path.

Although the present invention has been described above with reference to the example embodiments, the present invention is not limited to the example embodiments. The configurations and details of the present invention can be changed in various manners that can be understood by one skilled in the art within the scope of the present invention.

DESCRIPTION OF NUMERALS 10 detection apparatus
11 image acquiring unit
12 position detecting unit
13 distribution generating unit
14 imaging information generating unit
15 image storing unit
16 distribution storing unit
C camera
P person
100 image processing apparatus
101 CPU
102 ROM
103 RAM
104 programs
105 storage device
106 drive device
107 communication interface
108 input/output interface
109 bus
110 storage medium
111 communication network
121 position detecting unit
122 distribution generating unit
123 imaging information generating unit

The invention claimed is:

1. A video processing apparatus comprising:
at least one memory storing instructions; and
at least one processor configured to execute the instructions to:
receive a first image captured by a camera; and
control a range for capturing a second image by the camera based on a distribution of a face orientations of two or more persons shown in the first image, the second image being captured in a time after the first image.

2. The video processing apparatus according to claim 1, wherein the instruction to control the range includes changing an orientation of the camera.

3. The video processing apparatus according to claim 1, wherein the instruction to control the range includes changing a zoom of the camera.

4. The video processing apparatus according to claim 1, wherein the at least one processor is further configured to execute instructions to derive the distribution of the face orientation of two or more persons shown in the first image based on each of a position regarding the two or more persons shown in the first image.

5. The video processing apparatus according to claim 4, wherein the each of the position regarding the two or more persons indicates a position regarding a part of a person respectively.

6. The video processing apparatus according to claim 5, wherein the position regarding the part of the person includes a position regarding a face of the person.

7. The video processing apparatus according to claim 1, wherein the at least one processor is further configured to execute instructions to derive the distribution of the face orientation of two or more persons shown in the first image based on each of an orientation regarding the two or more persons shown in the first image.

8. The video processing apparatus according to claim 6, wherein the each of the orientation regarding the two or more persons is determined by an orientation regarding a face of a person respectively.

9. A video processing method comprising:
receiving a first image captured by a camera; and
controlling a range for capturing a second image by the camera based on a distribution of a face orientations of two or more persons shown in the first image, the second image being captured in a time after the first image.

10. The video processing method according to claim 9, wherein the controlling the range includes changing an orientation of the camera.

11. The video processing method according to claim 9, wherein the controlling the range includes changing a zoom of the camera.

12. The video processing method according to claim 9, further comprising
deriving the distribution of the face orientation of two or more persons shown in the first image based on each of a position regarding the two or more persons shown in the first image.

13. The video processing method according to claim 12, wherein the each of the position regarding the two or more persons indicates a position regarding a part of a person respectively.

14. The video processing method according to claim 13, wherein the position regarding the part of the person includes a position regarding a face of the person.

15. The video processing method according to claim 9, further comprising
deriving the distribution of the face orientation of two or more persons shown in the first image based on each of an orientation regarding the two or more persons shown in the first image.

16. The video processing method according to claim 14, wherein the each of the orientation regarding the two or more persons is determined by an orientation regarding a face of a person respectively.

17. A video processing apparatus comprising:
at least one memory storing instructions; and
at least one processor configured to execute the instructions to:
receive a first image captured by a camera; and
control a range for capturing a second image by the camera based on a distribution of image qualities of a face regions of two or more persons shown in the first image, the second image being captured in a time after the first image.

* * * * *